Nov. 4, 1930.        I. I. GREEN        1,780,383
CAMERA TRIPOD
Filed June 13, 1928
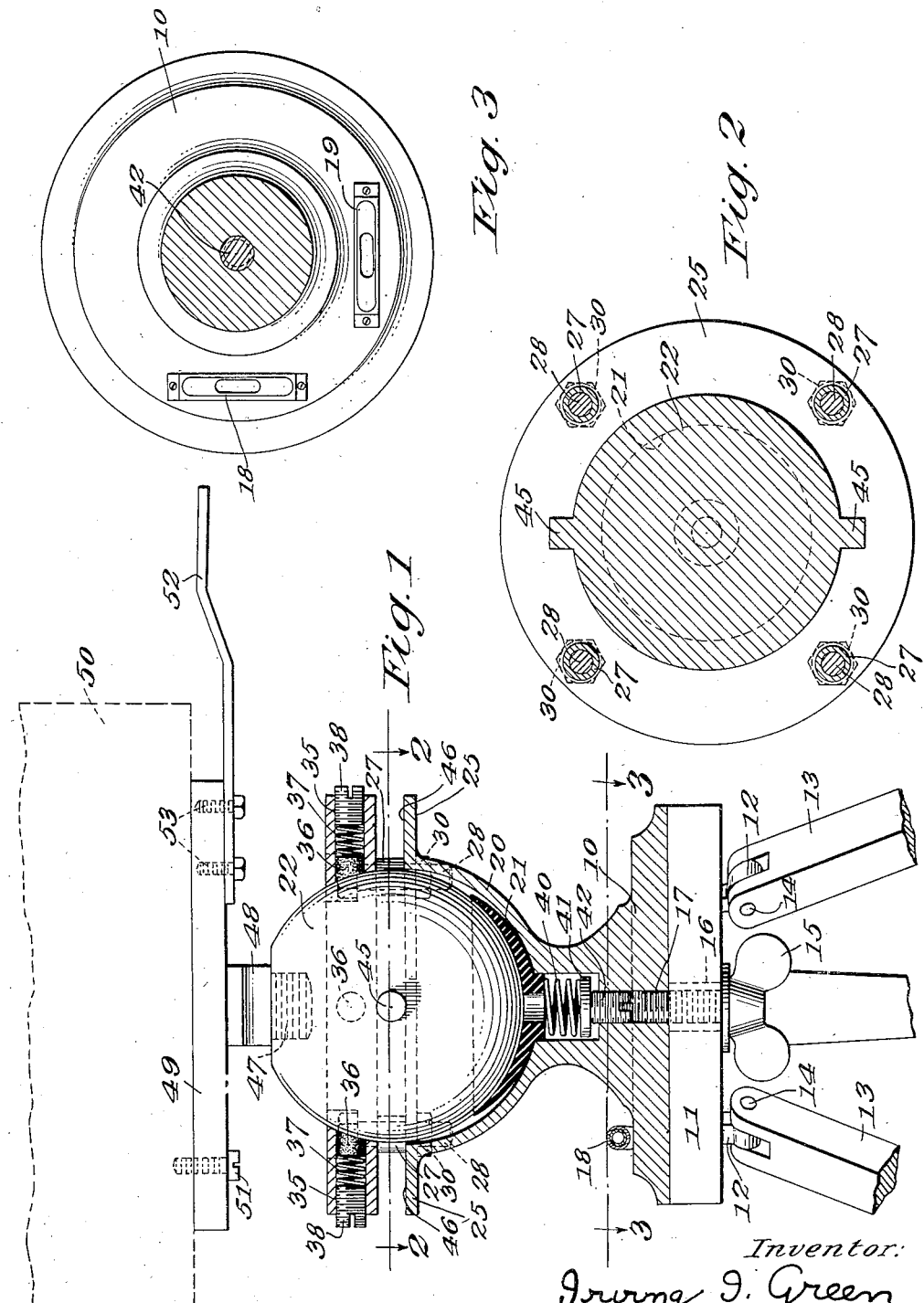
Inventor:
Irving I. Green
By Macleod, Calver, Copeland & Dike
Attorneys.

Patented Nov. 4, 1930

1,780,383

UNITED STATES PATENT OFFICE

IRVING I. GREEN, OF BROOKLINE, MASSACHUSETTS

CAMERA TRIPOD

Application filed June 13, 1928. Serial No. 284,943.

This invention relates to supports for moving picture cameras, telescopes and similar instruments which it is necessary to tip or turn at various angles from one position to one or more different positions.

In the most satisfactory devices of this type it has been necessary for one to operate a mechanism by one hand to tip the camera or similar instrument and to operate a separate mechanism with the other hand to turn the instrument. These devices have been difficult to operate and were objectionable because they required the operator to use both hands. On the other hand, other devices have not been wholly satisfactory because they did not assure a smooth even movement of the instrument and could be clamped in a desired position only with difficulty.

It is an object of the present invention to provide a rigid and stable support of this type which may be readily turned or tipped in any direction and held in that position by one hand while avoiding a direct diagonal movement and leaving the operator's other hand free to perform other duties. With this in view the invention provides a support including a sphere upon which a camera or the like is secured and which is movable to turn or tip the camera while an axis of the sphere is at all times guided in a predetermined plane thereby avoiding a direct diagonal movement. Preferably, the sphere is supported upon a bearing offering sufficient resistance to the movement of the sphere to hold the same in any desired position.

Before explaining in detail the present invention, and the method or mode of operation embodied therein, it is to be understood that the invention is not limited in its application to the details of construction and arrangement of parts illustrated in the accompanying drawings, since the invention is capable of other embodiments and of being practised or carried out in various ways. Also it is to be understood that the phraseology or terminology employed herein is for the purpose of description and not of limitation, and it is not intended to limit the invention beyond the terms of the several claims hereto appended or the requirements of the prior art.

The invention will be more clearly understood from the following description in conjunction with the accompanying drawings: in which, Fig. 1 is a sectional elevational view of a support embodying the invention;

Fig. 2 is a sectional view taken upon the line 2—2 of Fig. 1; and

Fig. 3 is a sectional view taken upon the line 3—3 of Fig. 1.

A support of the type to which the present invention is directed may comprise a base 10 adapted to be mounted upon a platform 11 of a suitable tripod. The platform 11 may be provided with a plurality of depending lugs 12 to each of which a leg 13 is pivotally mounted as by a pin 14. The base 10 may be secured upon the platform 11 in any suitable manner but in the form illustrated a thumb screw 15 is provided engaging the bottom surface of the platform 11 and extending upwardly through an opening 16 therein to engage a threaded opening 17 in the base. Preferably, the base 10 is provided with suitable levelling devices 18 and 19 disposed at right angles to each other in order to assure a proper set up of the device.

The base 10 may be provided with a depression or socket 20 adapted to receive a bearing 21 for supporting a sphere 22. An annular ring 26 surrounds the sphere 22 and is supported upon an annular flange 25 extending outwardly from the base in spaced relation thereto by a plurality of spacing rings 27. The ring 26 is secured to the flange 25 by a plurality of bolts 28 having heads engaging depressions in the ring 26 and passing through openings in the annular ring 26, spacing rings 27 and flange 25 and held in place by nuts 30. The sphere 22 may be held against the bearing 21 by the ring 26 but in the construction illustrated the ring 26 is provided with a plurality of threaded holes 35 each adapted to receive a movable plunger 36 which is held in contact with the sphere by a spring 37 extending between the plunger 36 and a plug 38 threaded in the opening 35. The opening 17 in the base is extended upwardly into the socket 20 to receive a spring 40 extending between the bottom of the bearing 21 and a washer 41 resting upon an adjusting screw 42. The sphere 22 is provided with a pair of trunnions 45 adapted to be received in the guideway 46 formed between the flange 25 and the lower surface of the ring 26.

The sphere 22 is provided with a threaded opening 47 adapted to receive a stud 48 depending from a support 49 for a camera 50 or similar instrument which is secured thereupon in any suitable manner as by screws 51 passing through the support 49 and engaging the instrument. A handle 52 is provided for moving the sphere 22 to turn or tip the camera 50 and in the form illustrated is secured to the support 49 as by bolts 53.

In setting up the support, the camera is mounted upon the support 49 and the pressure of the bearing 21 and the plungers 36 against the sphere 22 is adjusted by means of the adjusting screw 42 and the plugs 38 so as to resist the movement of the sphere when the camera is turned or tipped. This enables the camera or other instrument to be moved smoothly and evenly by operating the handle 52 with one hand to follow a moving object.

As the instrument is moved from one position an axis of the sphere is guided in a predetermined plane. In the preferred construction the axis through the trunnions 45 is guided in a horizontal plane by engagement of the trunnions in the horizontal guideway 46. In other words, regardless of how the camera is moved in following a moving object it is at all times properly guided to avoid the affects of a direct diagonal movement.

It will be noted that the bearing 21, which is preferably of non-metallic material such as hard rubber composition, is located at one side of the pivotal axis 45 of the sphere 22, and is floatingly carried on the spring pressed plunger 40, 41. This bearing is spherical and provides frictional resistance against the sphere over a considerable surface thereof. Moreover, in order to prevent vibration or lost motion of the sphere 22, and to support the latter above the pivots 45, the spring pressed plungers 36 are employed to act as an additional bearing thereby steadying the support 22 for the instrument. This construction is particularly valuable where heavy instruments are being used and which, due to their weight, are difficult to control and hold in tilted positions, and for which a stable and steady support is desirable to obtain most efficient results.

What I claim is:

1. In a device of the class described, an instrument support having a spherical base providing a supporting bearing, a trunnion for mounting said support to turn on a predetermined axis and located above said bearing, means for guiding the trunnion to move in a fixed plane and a spring pressed device disposed above said trunnion and acting against said support under tension during the movement thereof.

2. A support for an instrument such as a camera comprising a sphere provided with trunnions, an instrument support secured upon said sphere, an adjustable bearing mounted in said base for supporting said sphere, an annular flange on said base surrounding said sphere, an annular ring secured to and spaced from said flange and forming a horizontal guideway for said trunnions, and means for moving said sphere to turn or tip said instrument.

3. A support for an instrument such as a camera comprising a base having an opening, a sphere provided with trunnions, an instrument support secured upon the sphere, an adjustable bearing for supporting said sphere, means cooperating with said base for holding said sphere against said bearing and forming therewith a horizontal guideway for said trunnions, an adjusting screw in said opening operatively connected with said bearing to press the same against said sphere.

4. A support for an instrument such as a camera comprising a base having an opening, a bearing in said base, a sphere movable in said bearing and provided with trunnions, an annular flange on said base, an annular ring surrounding said sphere and secured to and spaced from said flange and forming a horizontal guideway for said trunnions, means for moving said sphere to turn or tip said instrument, an adjusting screw in said opening, and a spring in said opening between said screw and bearing.

In testimony whereof I affix my signature.

IRVING I. GREEN.